(12) United States Patent
Kocharlakota

(10) Patent No.: US 9,185,183 B2
(45) Date of Patent: Nov. 10, 2015

(54) METHOD AND SYSTEM FOR PROVIDING LOCATION-BASED USER INFORMATION VIA A MAP

(75) Inventor: Sridhar Kocharlakota, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 522 days.

(21) Appl. No.: 12/925,711

(22) Filed: Oct. 28, 2010

(65) Prior Publication Data
US 2011/0111770 A1 May 12, 2011

(30) Foreign Application Priority Data
Nov. 9, 2009 (KR) .................. 10-2009-0107544

(51) Int. Cl.
| | |
|---|---|
| H04W 4/00 | (2009.01) |
| H04W 24/00 | (2009.01) |
| H04M 11/04 | (2006.01) |
| H04L 29/08 | (2006.01) |
| G06Q 10/10 | (2012.01) |
| H04M 1/2745 | (2006.01) |
| H04M 1/725 | (2006.01) |
| H04W 4/02 | (2009.01) |

(52) U.S. Cl.
CPC .............. *H04L 67/306* (2013.01); *G06Q 10/10* (2013.01); *H04M 1/27455* (2013.01); *H04M 1/72572* (2013.01); *H04W 4/021* (2013.01); *H04W 4/027* (2013.01)

(58) Field of Classification Search
USPC .......... 455/414.2, 456.1, 456.3, 456.5, 456.6, 455/457, 459; 379/123, 142.1, 142.11, 379/201.06, 207.12; 709/219, 201, 202, 709/203
See application file for complete search history.

(56) References Cited

U.S. PATENT DOCUMENTS

| | | | | |
|---|---|---|---|---|
| 6,788,766 | B2 * | 9/2004 | Logan | 379/67.1 |
| 8,364,167 | B1 * | 1/2013 | Sylvain | 455/456.1 |
| 2004/0203919 | A1 * | 10/2004 | Ross et al. | 455/456.1 |
| 2005/0259658 | A1 * | 11/2005 | Logan et al. | 370/392 |
| 2007/0229549 | A1 * | 10/2007 | Dicke et al. | 345/676 |
| 2007/0287473 | A1 * | 12/2007 | Dupray | 455/456.1 |
| 2008/0070593 | A1 * | 3/2008 | Altman et al. | 455/457 |
| 2008/0132251 | A1 * | 6/2008 | Altman et al. | 455/457 |
| 2009/0112460 | A1 * | 4/2009 | Baker et al. | 701/208 |
| 2010/0106801 | A1 * | 4/2010 | Bliss et al. | 709/219 |
| 2011/0072020 | A1 * | 3/2011 | Ngo et al. | 707/739 |

\* cited by examiner

*Primary Examiner* — Kent Chang
*Assistant Examiner* — William Lu

(57) ABSTRACT

A method and system for providing location-based user information using a map is disclosed. The method includes displaying a plurality of local areas on a map. If one of the plurality of local areas is selected, user information corresponding to the selected local area is loaded, where the user information contains a name of a user, a phone number of the user, a subscribed local area where a wireless communication network service to which the user subscribes is provided, and a current local area where the user is currently receiving a wireless communication network service. The selected local area is displayed by distinguishing the selected local area from non-selected other local areas, a local time of the selected local area, and the user name from among the loaded user information. When displaying the user name, the phone number, the subscribed local area and the current local area are selectively displayed in addition to the user name.

28 Claims, 8 Drawing Sheets

METHOD AND SYSTEM FOR PROVIDING LOCATION-BASED USER INFORMATION VIA A MAP

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 9, 2009 and assigned Serial No. 10-2009-0107544, the entire disclosure of which is hereby incorporated by reference.

TECHNICAL FIELD OF THE INVENTION

The present invention relates to wireless communication network technology and, more particularly, to a method and system for providing user information associated with a user's location via a map.

BACKGROUND OF THE INVENTION

With the development of wireless communication network technology, wireless communication networks have been established in most countries around the world and are used to provide wireless communication services.

In recent years, the number of opportunities for people to communicate with each other irrespective of where they are located, such as a local area, a country, and so forth, has been increasing. This causes an increase in the number of international calls.

A roaming service refers to a service that lends another communication service provider's network and provides a communication service to a portable terminal user when the portable terminal is moved from one communication service provider's area to another. That is, the roaming service allows the portable terminal user to enjoy a communication service irrespective of where he/she is located.

Portable terminal users that subscribe to wireless communication services store user information including other users' contact information in their portable terminals, such that they can subsequently search for corresponding contact information or contact a called user corresponding to the information. In conventional technology, the user information is configured to contain simple information, for example, a name, a phonebook, and such. When a user searches for another user's name from his/her portable terminal, the portable terminal displays another user's phone number.

Therefore, a system is required to efficiently provide a variety of user information, based on local areas and countries where users are located and their movement.

SUMMARY OF THE INVENTION

To address the above-discussed deficiencies of the prior art, it is a primary object to provide a method and system that can classify information of other users, based on location, and provide it to a portable terminal user, via a map.

The present invention further provides a method and system that can intuitively provide information of other users, such as locations, to a portable terminal user, via a map.

In accordance with an embodiment of the present invention, the present invention provides a method for providing location-based user information using a map. The method includes displaying a plurality of local areas on a map. If one of the plurality of local areas is selected, user information corresponding to the selected local area is loaded, where the user information contains a name of a user, a phone number of the user, a subscribed local area where a wireless communication network service to which the user subscribes is provided, and a current local area where the user is currently receiving a wireless communication network service. The selected local area is displayed by distinguishing the selected local area from non-selected other local areas, a local time of the selected local area, and the user name from among the loaded user information. When displaying the user name, the phone number, the subscribed local area and the current local area are selectively displayed in addition to the user name.

Preferably, the user is at least one of a user who subscribes to a wireless communication network service in the selected local area and is currently using the wireless communication network service of the selected local area, a user who roams using a wireless communication network of the selected local area, and a user who roams from the selected local area, using a wireless communication network of the selected local area, to another local area by using another wireless communication network of another local area.

Preferably, the method may further include, if one of the other portable terminal users displayed on the screen is selected, making a call to a phone number of the selected other portable terminal user.

Preferably, the method may further include acquiring the current local area from location information corresponding to the user's current location that is transmitted from a location information server, where the location information corresponding to the user's current location is a Global Positioning System (GPS) signal.

In accordance with another embodiment of the present invention, the present invention provides a system for providing location-based user information using a map. The system includes a touch displaying unit for displaying a plurality of local areas on a map. The system also includes a touch input unit for detecting that one of the plurality of local areas is selected. A user information processor, which is also included in the system, loads user information corresponding to the selected local area and displays the selected local area by distinguishing the selected local area from non-selected other local areas. The user information contains a name of a user, a phone number of the user, a subscribed local area where a wireless communication network service to which the user subscribes is provided, and a current local area where the user is currently receiving a wireless communication network service. The user information processor also displays a local time of the selected local area and the user name from among the loaded user information where the phone number, the subscribed local area, and the current local area are selectively displayed.

Preferably, the user is at least one of a user who subscribes to a wireless communication network service in the selected local area and is currently using the wireless communication network service of the selected local area, a user who roams the selected local area using a wireless communication network of the selected local area, and a user who roams from the selected local area, using a wireless communication network of the selected local area, to another local area by using another wireless communication network of another local area.

Preferably, the system may further include a data processor for acquiring, if one of the other portable terminal users displayed on the screen is selected, a phone number of the selected other portable terminal user from the user information processor and for creating a message to request call connection to the acquired phone number. The system may also include a radio frequency (RF) communication unit for transmitting the message.

Preferably, the system may also include a user information configuring unit that receives the user name, the phone number, and the subscribed local area. The user information configuring unit may also create the user information, acquire the current local area from location information corresponding to the user's current location that is transmitted from a location information server, where the location information corresponding to the user's current location is a Global Positioning System (GPS) signal, and include the current local area in the user information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
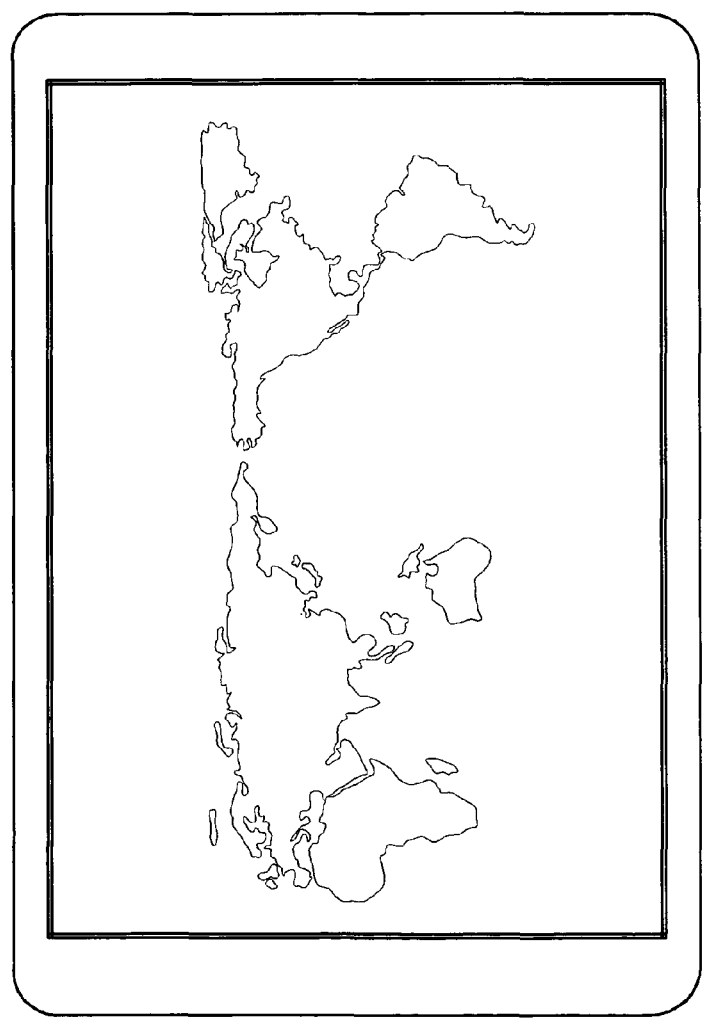
FIG. 1 illustrates a map for providing user information, according to an embodiment of the present invention.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Prior to explaining the embodiments of the present invention, terminologies will be defined for the present disclosure. The terms or words described in the present description and the claims should not be limited by a general or lexical meaning but, instead, should be analyzed as a meaning and a concept through which the inventor defines and describes the present invention. Therefore, one skilled in the art will understand that the embodiments disclosed in the description and configurations illustrated in the drawings are exemplary embodiments. There may be various modifications, alterations, and equivalents thereof to replace the embodiments at the time of filing this application.

In the following description, the term 'local area' refers to a location where a user is located and is divided into a subscribed local area and a current local area.

The term 'subscribed local area' refers to a wireless communication service area of a network service provider to which a portable terminal user subscribes. An example of the wireless communication network is a broadband wireless communication network (called a wireless network). The term 'current local area' refers to a local area where a user is currently receiving a wireless communication service. A current local area may overlap a subscribed local area or may differ from the subscribed local area according to a roaming operation.

In general, there may be many network service providers in one country. Multiple network service providers may provide their services to the same service area, for example, one local area. On the other hand, the network service providers may distinguish their service areas and provide their services to divided service areas that are respectively allocated to them. Therefore, if a plurality of network service providers provide their services to one local area, or if the service areas of the plurality of network service providers overlap in the local area, one country may be one local area. On the other hand, one country may comprise a plurality of local areas. In the following description, it is assumed that one local area means one country.

FIG. 1 illustrates a map for providing user information, according to an embodiment of the present invention.

In FIG. 1, it is assumed that the world map may be divided into a plurality of local areas.

Figure 2:
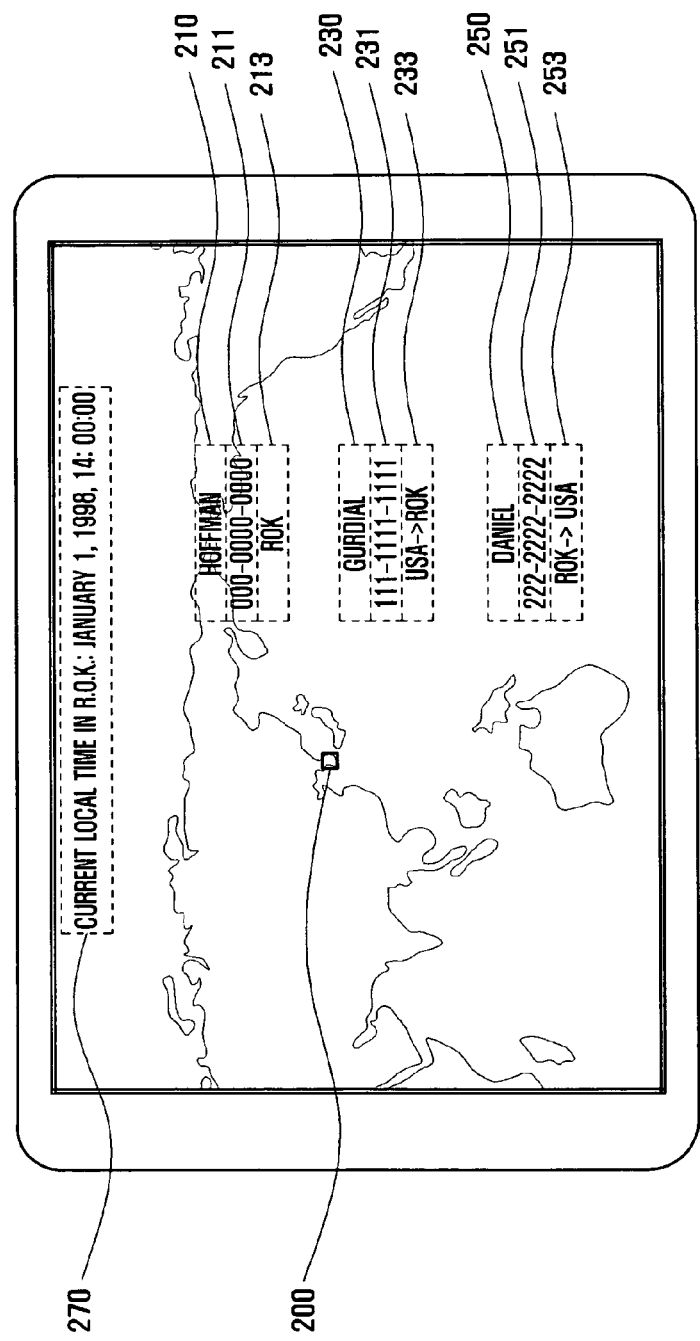
FIG. 2 illustrates a map when a user selects one of the local areas, according to an embodiment of the present invention.
Figure 3:
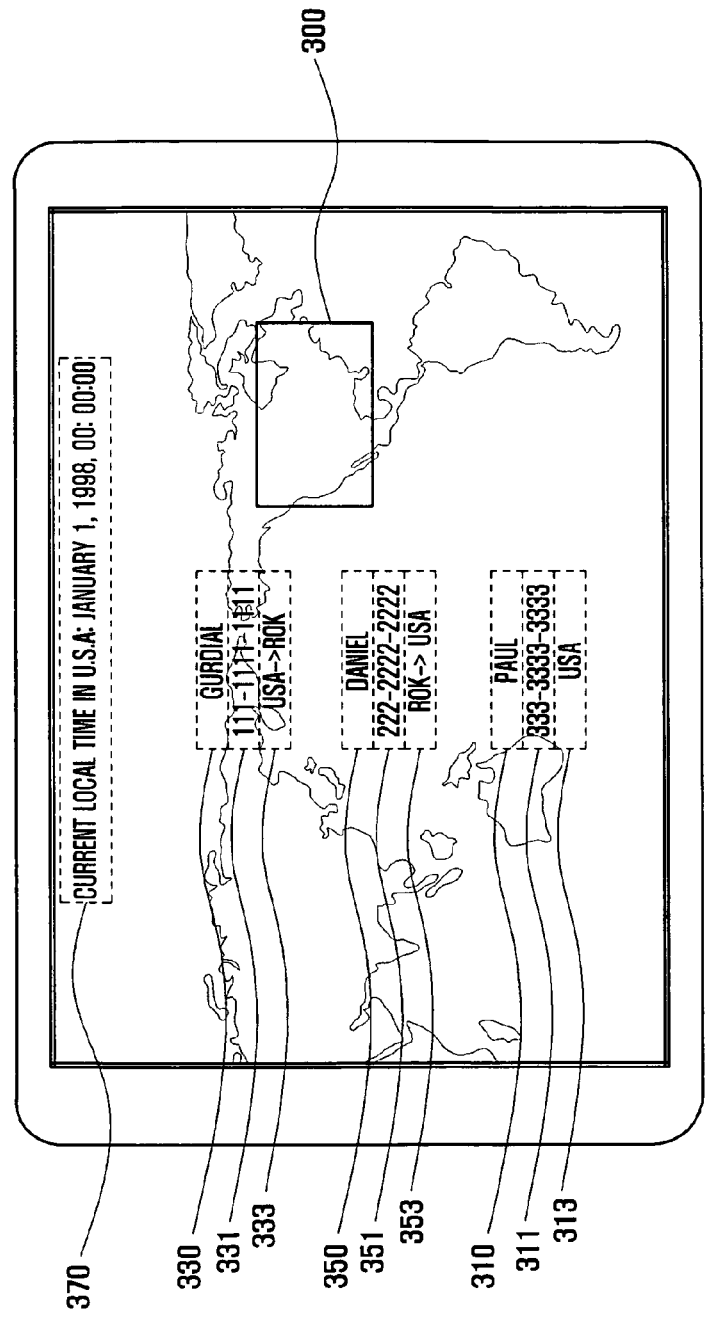
FIG. 3 illustrates a screen for when a user selects another of the local areas, according to an embodiment of the present invention.

FIG. 2 illustrates a map when a user selects one of the local areas, according to an embodiment of the present invention. FIG. 3 illustrates a screen for when a user selects another local area which differs from the area selected in the map of FIG. 2, according to an embodiment of the present invention.

Referring to FIGS. 1, 2, and 3, when a user selects a local area on a map displayed on the screen of FIG. 1, the system displays the selected local area, such that it can be distinguished from other local areas. The system also displays time of the selected local area and respective portable terminal users mapped to the selected local area. The system can further display the roaming states and phone numbers of the respective users. In addition, the system can selectively display the roaming states and phone numbers of the respective users. The roaming states show the current local areas and the subscribed local areas of the respective users.

In an embodiment of the present invention, the displayed users may be users who have subscribed to a wireless communication service provided via a wireless communication network in a selected local area and currently use the service.

The displayed users may also be users who roam in a selected local area using a wireless communication network of the selected local area or users who roam from a selected local area, using a wireless communication network of the selected local area, to another local area using a communication network of another local area.

In order to intuitively display a current location of a user, it is preferable that the system displays only the users who have subscribed to a wireless communication service provided via a wireless communication network in a selected local area and currently use the service and the users who roam in a selected local area using a wireless communication network of the selected local area. It is also preferable that the system does not display the users who roam from a selected local area, using a wireless communication network of the selected local area, to another local area using a wireless communication network of another local area.

Alternatively, in order to simultaneously display all the information, it is preferable that the system displays the users who have subscribed to a wireless communication service provided via a wireless communication network in a selected local area and currently use the service, the users who roam a selected local area using a wireless communication network of the selected local area, and the users who roam from a selected local area, using a wireless communication network of a selected local area, to another local area using a wireless communication network of another local area.

Referring to FIG. 2, when a user selects Republic of Korea (ROK) 200 as a local area, the system displays ROK 200, distinguished from other local areas and also a current local time 270 in ROK.

It is assumed that there are three users, Hoffman 210, Gurdial 230 and Daniel 250. Hoffman 210 is a user who has subscribed to a network service provider in ROK and is currently located in ROK. Gurdial 230 is a user who has subscribed to a network service provider in the USA and currently roams from the USA to ROK. Daniel 250 is a user who has subscribed to a network service provider in ROK and currently roams from ROK to the USA.

In order to intuitively display the users' current locations, it is preferable that only information regarding Hoffman 210 and Gurdial 230 is displayed. Alternatively, in order to simultaneously display all information, it is preferable that information regarding Hoffman 210, Gurdial 230 and Daniel 250 are displayed.

In particular, phone numbers 211, 231, and 251, subscribed local areas and roaming states 213, 233, and 253 of the respective users are selectively displayed.

If user input, such as a touch interaction, is applied to select one of the three users, Hoffman 210, Gurdial 230 and Daniel 250 on the screen shown in FIG. 2, call connection can be established via the phone number 211, 231, or 251 corresponding to the selected user.

Referring to FIG. 3, when a user selects the USA 300 as a local area, the system displays the USA 300, by distinguishing from other areas, and also a current local time 370 in the USA.

It is assumed that there are three users, Paul 310, Gurdial 330 and Daniel 350. Paul 310 is a user who has subscribed to a network service provider in the USA and is currently located in the USA. Gurdial 330 is a user who has subscribed to a network service provider in the USA and currently roams from the USA to ROK. Daniel 250 is a user who has subscribed to a network service provider in ROK and currently roams from ROK to the USA.

In order to intuitively display the users' current locations, it is preferable that only information regarding Paul 310 and Daniel 350 is displayed. In order to simultaneously display all information, it is preferable that information regarding Paul 310, Gurdial 330 and Daniel 350 are displayed.

In particular, phone numbers 311, 331, and 351, and subscribed local areas and roaming states 313, 333, and 353 of the respective users are selectively displayed.

If a touch is applied to select one of the three users, Paul 310, Gurdial 330 and Daniel 350 on the screen shown in FIG. 3, call connection can be established via the phone number 311, 331, or 351 corresponding to the selected user.

Figure 4:
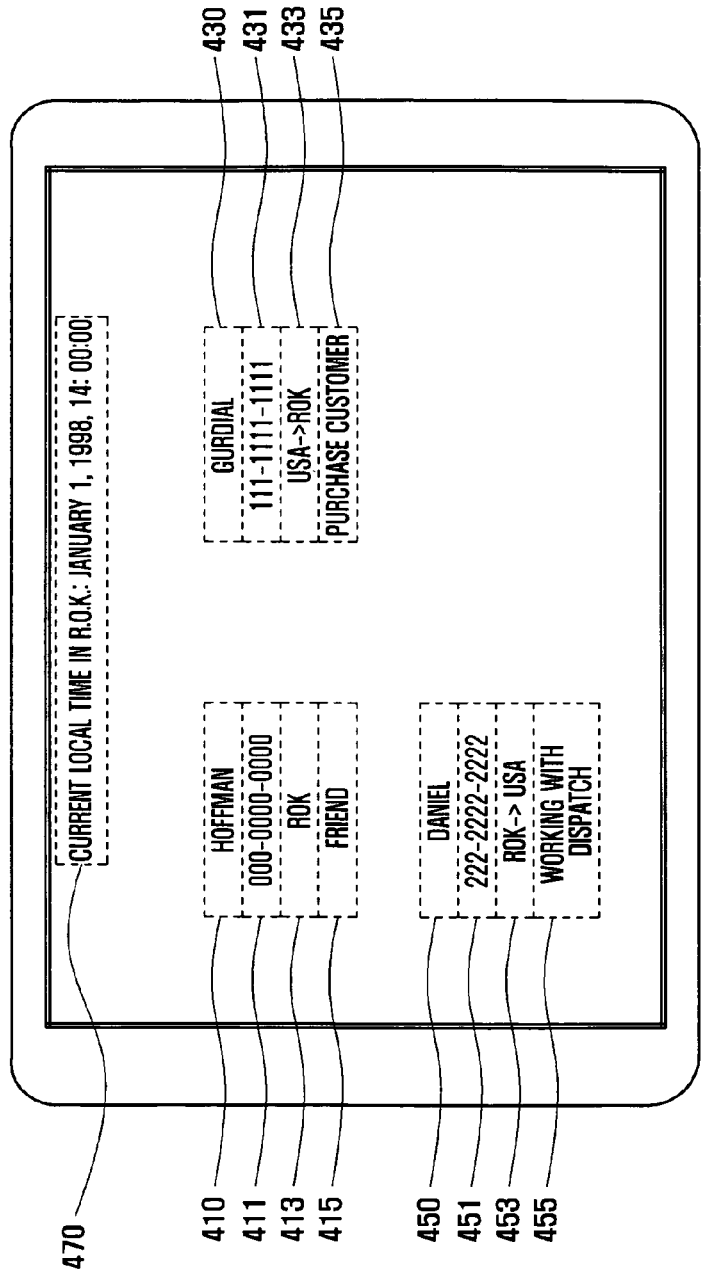
FIG. 4 illustrates a screen for when the user re-selects the previously selected local area shown in FIG. 2.
Figure 5:
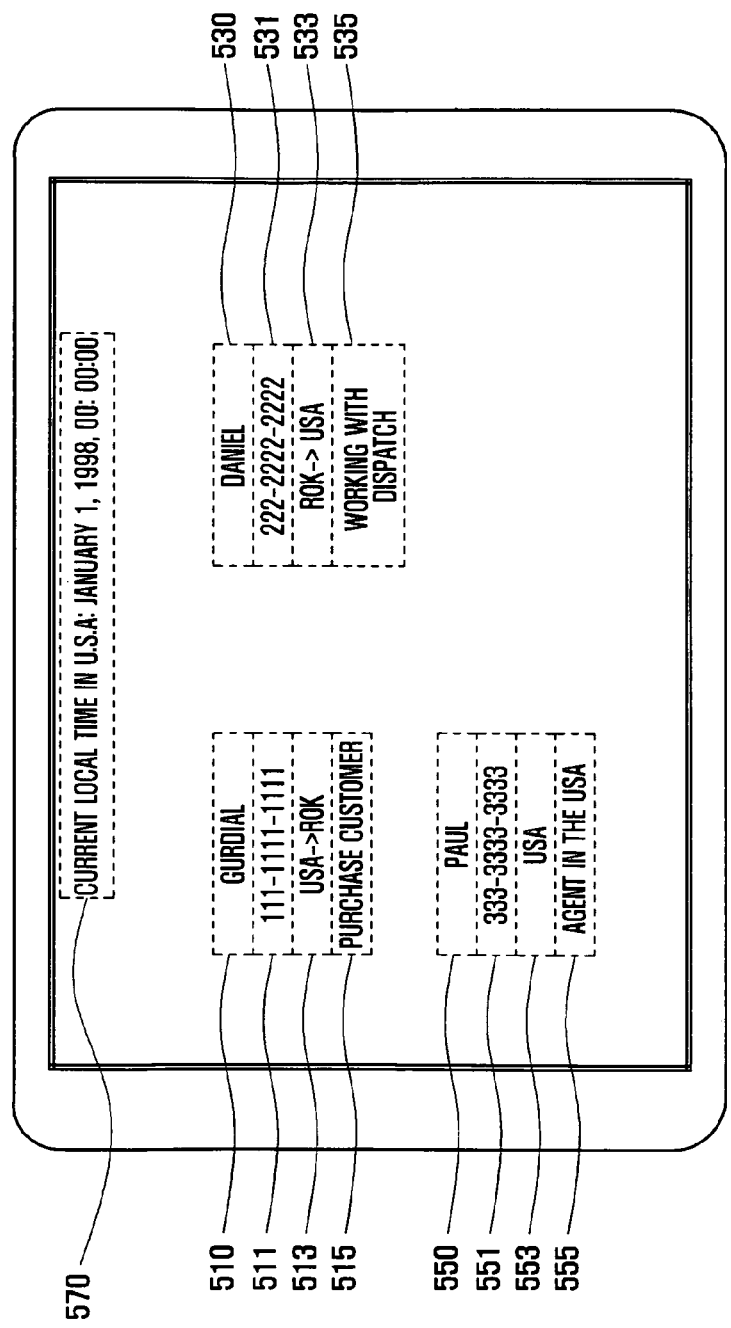
FIG. 5 illustrates a screen for when the user re-selects the previously selected local area shown in FIG. 3.

FIG. 4 illustrates a screen for when the user re-selects the previously selected local area shown in FIG. 2. FIG. 5 illustrates a screen for when the user re-selects the previously selected local area shown in FIG. 3.

If a selected local area is re-selected on the screen shown in FIG. 2 or 3, the system displays a local time of the selected local area. The system also displays respective users mapped to the selected local area and further displays subscribed local areas, roaming information containing current local areas, phone numbers, and additional information of the respective users. The roaming information, phone numbers, and additional information of the respective users may be selectively displayed. The additional information contains address, birthday, and a memo of a corresponding user.

More specifically, referring to FIG. 4, when the selected local area, ROK, is re-selected on the screen shown in FIG. 2, the system displays the current local time 470 of the selected local area, ROK, users 410, 430, and 450, users' phone numbers 411, 431, and 451, roaming states 413, 433 and 453, and additional information 415, 435 and 455.

If a touch is applied to select one of the three users, Hoffman 410, Gurdial 430, and Daniel 450, on the screen shown in FIG. 4, call connection can be established via the phone number 411, 431, or 451 corresponding to the selected user.

Likewise, referring to FIG. 5, when the selected local area, USA, is re-selected on the screen shown in FIG. 3, the system displays the current local time 570 of the selected local area, USA, users 510, 530, and 550, users' phone numbers 511, 531, and 551, roaming states 513, 533, and 553, and additional information 515, 535 and 555.

If a touch is applied to select one of the three users, Gurdial 510, Daniel 530, and Paul 550 on the screen shown in FIG. 5, call connection can be established via the phone number 511, 531, or 551 corresponding to the selected user.

Figure 6:
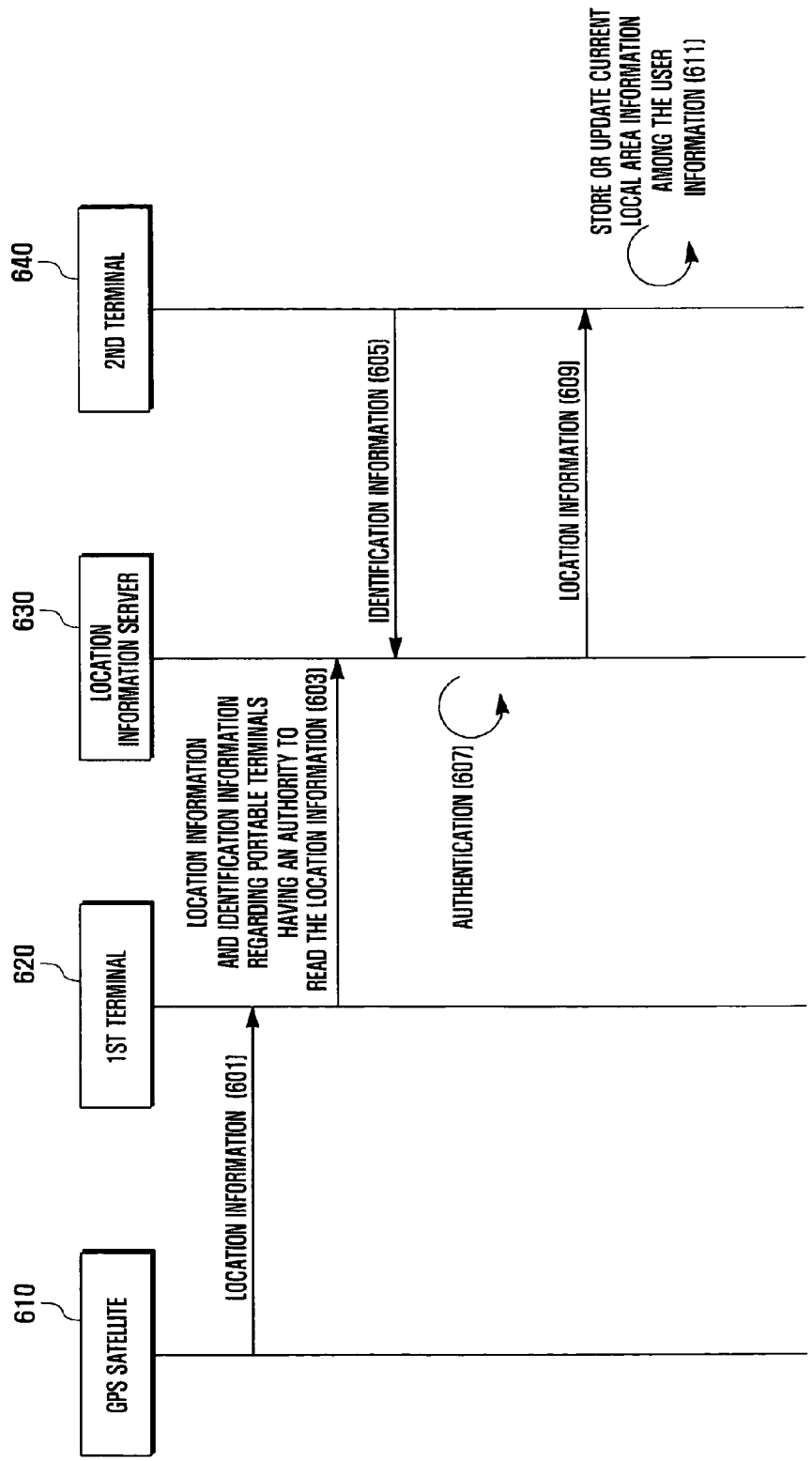
FIG. 6 illustrates a process for storing and updating user information, according to an embodiment of the present invention.

FIG. 6 illustrates a process for storing and updating user information, according to an embodiment of the present invention. It is assumed that the second portable terminal 640 stores or updates user information (e.g. current location) regarding the first portable terminal 620.

The following table 1 describes user information.

TABLE 1

| User SN | Name | Phone Number | Subscribed Local Area | Current Local Area | Additional Information |
|---|---|---|---|---|---|
| 1 | Hoffman | 000-0000-0000 | ROK | Blank | Friend |
| 2 | Gurdial | 111-1111-1111 | USA | Blank | Customer |
| 3 | Daniel | 222-2222-2222 | ROK | Blank | Working with dispatch |
| 4 | Paul | 333-3333-3333 | USA | Blank | Local agent |

Referring to table 1, the user information is comprised of fields for user name, phone number, subscribed local area, current local area, and additional information.

The first and second portable terminals 620 and 640 can store the user information described in table 1. The user can directly enter user information, except for information regarding the current local area, in the portable terminal. User information can be processed via a phone book application program. For example, the phone book application stores the user information in the storage unit. It is assumed that the first and second portable terminals 620 and 640 can exchange user information, except for information regarding the current local area, with each other and subsequently store the exchanged user information.

In process 601, the first portable terminal 620 acquires its location information from a Global Positioning System (GPS) satellite 610. To this end, the first portable terminal 620 includes a GPS receiver module. In process 603, the first portable terminal 620 transmits its location information and identification information regarding portable terminals that have an authority to read the location information to a location information server 630. In an embodiment of the present invention, the first portable terminal 620 transmits its location information and identification information regarding the second portable terminal 640 to the location information server 630. An example of the identification may be a phone number of the second portable terminal 640.

In process 605, the second portable terminal 640 transmits its identification information to the location information server 630, requesting to acquire the location information regarding the first portable terminal 620.

In process 607, the location information server 630 receives the identification information regarding the second portable terminal 640 and performs an authentication procedure 607 using the received identification information. If the location information server 630 ascertains that the second portable terminal 640 has an authority to read the location information regarding the first portable terminal 620, it provides the location information regarding the first portable terminal 620 to the second portable terminal 640 in process 609.

In process 611, the second portable terminal 640 updates information regarding a current location field in the user information regarding the first portable terminal 620 using the received location information regarding the first portable terminal 620. The location information regarding the first portable terminal 620 may be expressed via latitude and longitude. The second portable terminal 640 can acquire a local area where the first portable terminal 620 is currently located, via the latitude and longitude contained in the location information regarding the first portable terminal 620, transmitted from the GPS satellite 610. The second portable terminal 640 updates the information in the current local area field for the first portable terminal 620 with the acquired local area.

Therefore, the second portable terminal 640 can update the record of the first portable terminal 620 by updating the information regarding the current local area field of the first portable terminal 620. As such, the name, the phone number, the subscribed local area and the current local area of the first portable terminal 620 are mapped to each other.

The following table 2 describes user information.

TABLE 2

| SN | User Name | Phone Number | Subscribed Local Area | Current Local Area | Additional Information |
|---|---|---|---|---|---|
| 1 | Hoffman | 000-0000-0000 | ROK | ROK | Friend |
| 2 | Gurdial | 111-1111-1111 | USA | ROK | Customer |
| 3 | Daniel | 222-2222-2222 | ROK | USA | Working with dispatch |
| 4 | Paul | 333-3333-3333 | USA | USA | Local agent |

Referring to table 2, the user information is comprised of fields for user name, phone number, subscribed local area, current local area, and additional information. A roaming state of a portable terminal user can be expressed by information regarding the subscribed local area and the current local area.

Figure 7:
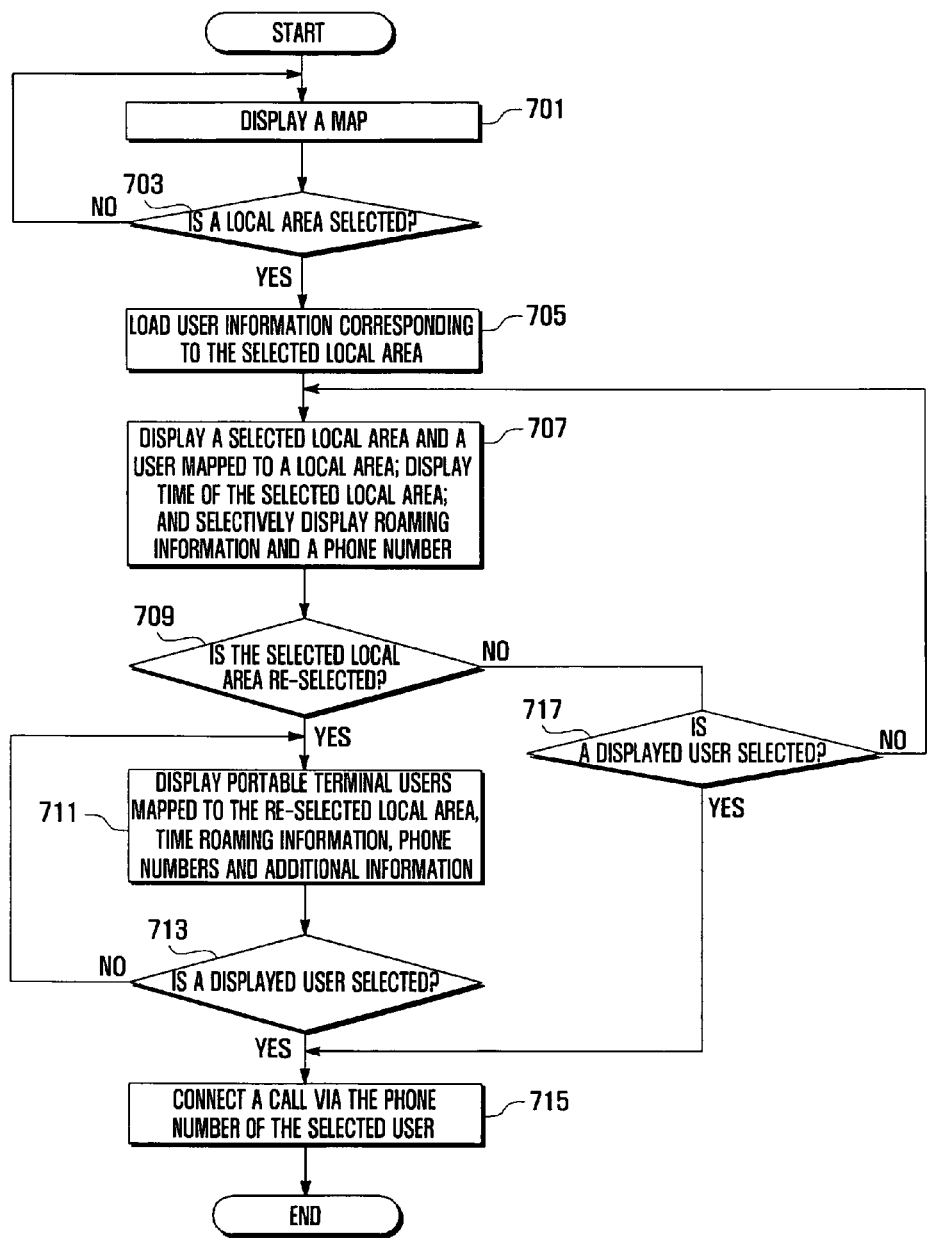
FIG. 7 illustrates a process for providing user information using a map, according to an embodiment of the present invention.

FIG. 7 illustrates a process for providing user information using a map, according to an embodiment of the present invention. It is assumed that a portable terminal already has stored user information regarding other portable terminals. It is also assumed that the portable terminal is equipped with a touch screen.

Referring to FIGS. 1 to 5 and FIG. 7, the portable terminal displays a map on its touch screen in block 701.

In block 703, the portable terminal determines whether a portable terminal user touches the touch screen to select a particular local area in the map. If the portable terminal user has interacted with the touch screen to select a particular local area on the map in block 703, the portable terminal loads user information corresponding to the portable terminal user's touched local area in block 705. The user information includes names, phone numbers, subscribed local areas, and current local areas of the other portable terminal users, as described in Table 1. In an embodiment of the present invention, the portable terminal loads user information corresponding to at least one of the subscribed local area and the current local area that corresponds to the portable terminal user's touched local area.

In block 707, the portable terminal displays the selected local area (distinguished from other non-selected local areas) and a local time of the selected local area, names and phone numbers of the other portable terminal users mapped to the selected local area, subscribed local areas of the other portable terminal users, and roaming information containing the current local areas of the other portable terminal users. The roaming information and phone numbers of the respective other portable terminal users may be selectively displayed according to the options discussed with regard to FIGS. 2 and 3.

The portable terminal user can reselect the selected local area or one of other portable terminal users displayed on the screen as shown in FIGS. 2 and 3. In block 709, the portable terminal determines whether the portable terminal user has re-selected the selected local area. If the portable terminal ascertains that its user has re-selected the selected local area at block 709, it displays the names, phone numbers, subscribed local areas, current local areas, and additional information of the other portable terminal users mapped to the re-selected local area, as shown in FIGS. 4 and 5, in block 711.

In block 713, the portable terminal determines whether the user has selected one of the other portable terminal users displayed on the screen as shown in FIGS. 4 and 5. If the portable terminal user has selected one of the other portable terminal users displayed on the screen in block 713, the portable terminal makes a call via the phone number of the selected portable terminal user in block 715. Alternatively, if the portable terminal user has not selected one of the other portable terminal users displayed on the screen in block 713, it returns to block 711.

In contrast, if the portable terminal ascertains that the portable terminal user has not re-selected the selected local area at block 709, the portable terminal determines whether the portable terminal user selects one of the other portable terminal users in other local area displayed on the screen in block 717. If the portable terminal user selects one of the other portable terminal users displayed on the screen in block 717, the portable terminal makes a call via the phone number of the selected portable terminal user at block 715. If the portable terminal user has not selected one of the other portable terminal users displayed on the screen in block 717, it returns to and proceeds with block 707.

Figure 8:
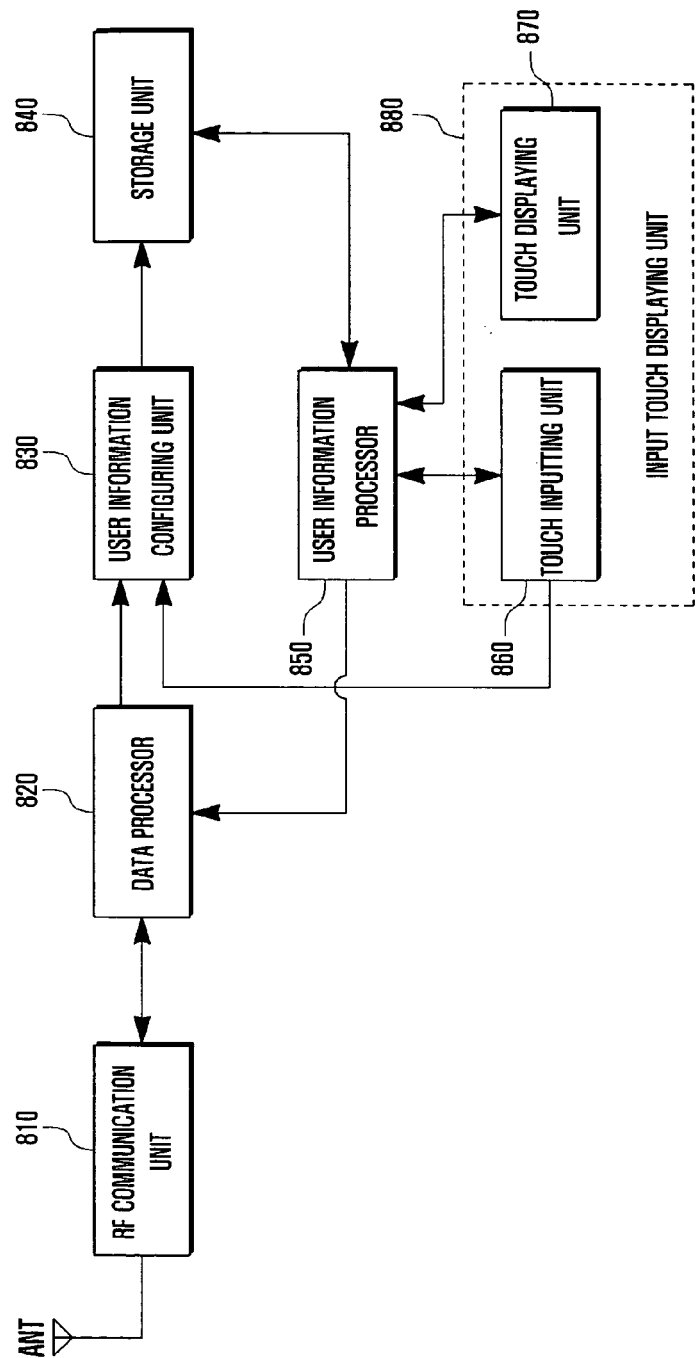
FIG. 8 illustrates a system for providing user information using a map, according to an embodiment of the present invention.

FIG. 8 illustrates a system for providing user information using a map, according town embodiment of the present invention.

Referring to FIG. 8, the system includes an RF communication unit 810, a data processor 820, a user information-configuring unit 830, a storage unit 840, a user information processor 850, and an input touch displaying unit 880.

The RF communication unit 810 includes a transmitter and a receiver. The transmitter converts a baseband signal from the data processor 820 into intermediate frequency (IF) and radio frequency (RF) signals and transmits them via an antenna ANT. The receiver converts RF signals received by the antenna ANT into IF and baseband signals and outputs them to the data processor 820.

The data processor 820 extracts information from the received baseband signals and processes the extracted information. The data processor 820 carries particular information via a baseband signal and outputs it to the RF communication unit 810.

The user information configuring unit 830 creates user information according to the present invention and stores it in the storage unit 840. The user information is stored in a table format such as described with regard to Tables 1 and 2.

The storage unit 840 stores data and user information. In an embodiment of the present invention, the storage unit 840 stores user information in a table format, where the user information is comprised of fields, such as a user name, a phone number, a subscribed local area, a current local area, and additional information of the user.

The user information processor 850 controls the input touch displaying unit 880 to display the screens, shown in FIGS. 1 to 5, based on user input. The user information processor 850 loads user information from the storage unit 840 and controls the input touch displaying unit 880 to display user information according to the user's touched (selected) local area. The user information processor 850 controls the input touch displaying unit 880 to display the user's selected local area (by distinguishing the selected local area from other local areas) and other portable terminal users of the selected local area. In addition, the user information processor 850 can also control the input touch displaying unit 880 to selectively display the roaming states and the phone numbers of other portable terminal users.

The input touch display unit 880 may be implemented with a touch screen. The input touch displaying unit 880 includes a touch inputting unit 860 and a touch displaying unit 870. The touch inputting unit 860 detects touch interactions by the user and provides them to the user information configuring unit 830 and the user information processor 850. The touch displaying unit 870 receives screen data from the user information processor 850 and displays corresponding screens.

In the following description, a method for configuring and storing user information in the portable terminal is explained in detail.

When the user enters user information regarding other portable terminal users to the touch inputting unit 860, the user information configuring unit 830 configures a database using the entered user information. The user information is comprised of fields such as a user name, a phone number, a subscribed local area, a current local area, and additional information, as described with regard to Table 1.

The entered user information does not contain current locations of other portable terminals. The current locations of other portable terminals can be acquired by the portable terminal as follows. The portable terminal can acquire the information regarding a current location of other portable terminal from the location information server 630. That is, the RF communication unit 810 receives location information regarding other portable terminals from the location information server 630 and outputs it to the data processor 820. The data processor 820 outputs the received location information to the user information configuring unit 830. The location information, received by the user information configuring unit 830, corresponds to a GPS signal that can be expressed by latitude and longitude. The user information configuring unit 830 can acquire a local area where the other portable terminal is currently located, via the latitude and longitude. The user information configuring unit 830 then records the acquired local area in the current local area field of the table for the user information as described in table 2.

The following describes a method for displaying user information, stored in a table by the method described above, on a map according to a user's selected local area.

If a user selects a certain local area on the map displayed on a screen of the touch display unit 870, the touch inputting unit 860 detects the selected local area and outputs it to the user information processor 850.

The user information processor 850 loads user information corresponding to the user's selected local area. The user information contains a user name, a phone number, a subscribed local area, and a current local area. The user information processor 850 can load user information corresponding to at least one of the subscribed local area and the current local area. After that, the user information processor 850 controls the touch displaying unit 870 to display a part or all of the loaded user information.

If the portable terminal user selects one of the other portable terminal users on the screen, the user information processor 850 outputs the phone number of the selected other portable terminal user to the data processor 820. The data processor 820 creates a message for requesting to make a callusing the received phone number and transmits the message to a serving base station via the RF communication unit 810. If the call is established between the portable terminal and the serving base station, the portable terminal user can communicate with the other portable terminal user.

As described above, the method and system according to the present invention can allow a user to classify contact information regarding other users based on local areas, using a map, and can provide it to the user. Therefore, the method and system is advantageous in that the user can rapidly search for contact information regarding other users in a corresponding area.

The method and system according to the present invention can allow a user to classify contact information regarding other users based on local areas, using a map, and can provide the user with the classified contact information, together with local times to which the time difference, between the user's located area and the corresponding local areas where the other users are located, is reflected. Therefore, the method and system is advantageous in that the user can recognize an available time to call a corresponding user.

The method and system according to the present invention can display a location where another user is located on a map shown on a user's portable terminal. This allows the user to intuitively recognize another user's location. This function is effective when the other user is using a roaming service.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing location-based contact information using a map, the method comprising:
displaying, at a wireless terminal, a plurality of areas on a map;
loading, at the wireless terminal, if one of the plurality of areas is selected, contact information associated each of a plurality of contacts corresponding to the selected area, the contact information associated with each contact comprising at least one of a name of a contact, a phone number of the contact, a subscribed area where a wireless communication network service is provided by a network service provider to which the contact subscribes, and a current area where the contact is currently receiving a wireless communication network service; and
displaying, at the wireless terminal, roaming information for each of the plurality of contacts corresponding to the selected area.

2. The method of claim 1, further comprising displaying at least a portion of the loaded contact information corresponding to the selected area.

3. The method of claim 1, wherein the contacts comprise at least one of:
a user who subscribes to a wireless communication network service in the selected area and is currently using the wireless communication network service of the selected area;
a user who roams in the selected area using a wireless communication network of the selected area; and
a user who roams from the selected area, using a wireless communication network of the selected area, to another area using another wireless communication network of another area.

4. The method of claim 1, further comprising:
if one of the contacts displayed on the screen is selected, making a call to a phone number of the selected contact.

5. The method of claim 1, further comprising:
acquiring the current area from location information corresponding to a contact's current location that is transmitted from a location information server, wherein the location information corresponding to the contact's current location is a Global Positioning System (GPS) signal.

6. The method of claim 5, wherein acquiring the current area corresponding to a contact's current location comprises:
sending to the location information server a request for the contact's current location, wherein the request comprises authentication information.

7. The method of claim 5, further comprising:
updating the current area where the contact is currently receiving the wireless communication network service.

8. The method of claim 1, further comprising:
if the selected area is re-selected, displaying a time of the selected area, and at least one of the name, the phone number, the subscribed area, the current area, and additional information for each of the plurality of contacts corresponding the selected area.

9. The method of claim 1, wherein loading the contact information corresponding to the selected area comprises:
loading the contact information associated with users who subscribe to a wireless communication network service in the selected area and are currently using the wireless communication network service of the selected area and users who roam in the selected area using a wireless communication network of the selected area.

10. The method of claim 3, further comprising:
acquiring the current area from location information corresponding to a contact's current location that is transmitted from a location information server, wherein the location information corresponding to the contact's current location is a Global Positioning System (GPS) signal.

11. The method of claim 1, wherein the wireless communication network services may be provided by different network service providers.

12. The method of claim 1, farther comprising displaying the subscribed area and the current area of each of the plurality of contacts.

13. The method of claim 1, wherein the displaying of the roaming information further comprises:
determining, at the wireless terminal, whether each of the plurality of contacts is in roaming state or not based on the subscribed area and the current area of each of the plurality of contacts; and
displaying the roaming information based on a result of determination.

14. The method of claim 13, wherein the wireless terminal determines that a contact is in roaming state, if a subscribed area of the contact is different from a current area of the contact.

15. A system for providing location-based contact information using a map, comprising:
a touch displaying unit configured to display a plurality of areas on a map;
a touch inputting unit configured to detect that one of the plurality of areas is selected;
a storage unit configured to store contact information; and
a user information processor configured to load contact information associated with each of a plurality of contacts corresponding to the selected area, and display a roaming information for each of the plurality of contacts,
wherein the contact information associated with each contact comprises at least one of a name of a contact, a phone number of the contact, a subscribed area where a wireless communication network service is provided, by a network service provider to which the contact subscribes, and a current area where the contact is currently receiving a wireless communication network service.

16. The system of claim 15, wherein the user information processor is further configured to display at least a portion of the loaded contact information corresponding to the selected area.

17. The system of claim 15, wherein the contacts comprise at least one of:
a user who subscribes to a wireless communication network service in the selected area and is currently using the wireless communication network service of the selected area;
a user who roams in the selected area using a wireless communication network of the selected area; and
a user who roams from the selected area, using a wireless communication network of the selected area, to another area using another wireless communication network of other area.

18. The system of claim 15, further comprising:
a data processor configured to acquire, if one of the contacts displayed on the screen is selected, a phone number of the selected other portable terminal user from the user information processor and to create a message to request call connection to the acquired phone number; and a radio frequency (RF) communication unit configured to transmit the message.

19. The system of claim 15, further comprising:

a contact information configuring unit configured to receive the name, the phone number, and the subscribed area of a contact, create the contact information, acquire the current area from location information corresponding to the contact's current location that is transmitted from a location information server, where the location information corresponding to the user's current location is a Global Positioning System (GPS) signal, and include the current area in the contact information.

20. The system of claim 19, wherein the contact information configuring unit acquires the current area corresponding to a contact's current location by sending to the location information server a request for the contact's current location, wherein the request comprises authentication information.

21. The system of claim 19, wherein the data processor updates the contact information in the storage unit with the current area where the contact is currently receiving the wireless communication network service.

22. The system of claim 15, wherein if the selected area is re-selected, the contact information processor displays a time of the selected area, and at least one of the name of the contact, the phone number of the contact, the subscribed area, and the current area, and additional information for each of the plurality of contacts corresponding the selected area.

23. The system of claim 15, wherein the contact information processor loads the contact information corresponding to the selected area by loading the contact information associated with users who subscribe to a wireless communication network service in the selected area and are currently using the wireless communication network service of the selected area and users who roam the selected area using a wireless communication network of the selected area.

24. The system of claim 17, further comprising:

a contact information configuring unit configured to receive the name, the phone number, and the subscribed area of a contact, create the contact information, acquire the current area from location information corresponding to the contact's current location that is transmitted from a location information server, where the location information corresponding to the user's current location is a Global Positioning System (UPS) signal, and include the current area in the contact information.

25. The system of claim 15, wherein the wireless communication network services may be provided by different network service providers.

26. The system of claim 15, wherein the user information processor is further configured to display the subscribed area and the current area of each of the plurality of contacts.

27. The system of claim 15, wherein the user information processor is further configured to determine whether each of the plurality of contacts is in roaming state or not based on the subscribed area and the current area of each of the plurality of contacts and display the roaming information based on a result of determination.

28. The system of claim 27, wherein the user information processor determines that a contact is in roaming state, if a subscribed area of the contact is different from a current area of the contact.

* * * * *